United States Patent [19]
Cole et al.

[11] Patent Number: 6,072,926
[45] Date of Patent: Jun. 6, 2000

[54] OPTICAL WAVEGUIDE GRATING

[76] Inventors: Martin Cole, 11 Beverley Road, Dibden Purlieu, Southampton, Hampshire, S045 4HR; Wei-Hung Loh, 12 Oakdene Court, Welbeck Avenue, Southampton, Hampshire, S017 1UT; Richard Ian Laming, 4 Pegasus Close, Hamble, Southampton, Hampshire, S031 4QZ; Michael Nickolaos Zervas, 3 Clifford Dibben Mews, Southampton, S014 0TP, all of United Kingdom

[21] Appl. No.: 08/952,303
[22] PCT Filed: May 14, 1996
[86] PCT No.: PCT/GB96/01154
    § 371 Date: Apr. 16, 1998
    § 102(e) Date: Apr. 16, 1998
[87] PCT Pub. No.: WO96/36895
    PCT Pub. Date: Nov. 21, 1996

[30] Foreign Application Priority Data

May 16, 1995 [GB] United Kingdom .................. 9509874

[51] Int. Cl.[7] .................................................. G02B 6/34
[52] U.S. Cl. ............................................. 385/37; 430/290
[58] Field of Search .............................. 385/37; 430/290; 359/566, 569

[56] References Cited

U.S. PATENT DOCUMENTS

| | | | |
|---|---|---|---|
| 5,066,133 | 11/1991 | Brienza | 359/570 |
| 5,104,209 | 4/1992 | Hill et al. | 385/27 |
| 5,367,588 | 11/1994 | Hill et al. | 385/37 |
| 5,619,603 | 4/1997 | Epworth et al. | 385/37 |
| 5,652,818 | 7/1997 | Byron | 385/37 |
| 5,837,169 | 11/1998 | Rourke | 264/1.27 |
| 5,912,999 | 6/1999 | Brennan, III et al. | 385/37 |

FOREIGN PATENT DOCUMENTS 0 604 039 A2  6/1994  European Pat. Off. .......... G02B 6/16

OTHER PUBLICATIONS

R. Kashyap et al., "UV Written Reflection Grating Structures In Photosensitive Optical Fibres Using Phase–Shifted Phase Masks", Electronics Letters, vol. 30, No. 23, pp. 1977–1978, Nov. 10, 1994.

J. Martin et al., "Novel Writing Technique Of Long And Highly Reflective In–Fibre Gratings", Electronic Letters, vol. 30, No. 10, pp. 811–812, May 12, 1994.

Primary Examiner—John D. Lee
Assistant Examiner—Juliana K. Kang
Attorney, Agent, or Firm—Renner, Otto, Boisselle & Sklar, P.L.L.

[57] ABSTRACT

A method of forming optical waveguide gratings, such as in-fiber gratings, is described. The gratings are formed optically, with a phase mask being scanned by a writing laser beam to generate the grating pattern. The waveguide and phase mask are moved with respect to one another during the writing process, to vary the grating properties along the length of the grating. Relative movement in a single direction provides a chance of grating pitch, and so can be used to fabricate chirped or multi-wavelength gratings. Bi-directional dither alters the strength of the grating, and so can be used to fabricate apodised gratings.

14 Claims, 4 Drawing Sheets

OPTICAL WAVEGUIDE GRATING

This invention relates to optical waveguide gratings.

Optical waveguide gratings such as fibre Bragg gratings are recognised as key components for many fibre optic and laser systems, but ways for improving their characteristics and ease of fabrication continue to be a subject of considerable research interest. One recently proposed technique is the use of so-called phase casks for grating production (publication references 1 and 2 below). In this technique, a grating is imposed on a photosensitive optical waveguide by projecting writing optical radiation through the phase mask onto the waveguide.

The phase mask approach is attractive for it allows fibre gratings to be written with much relaxed tolerances on the coherence of the writing beam (in comparison with, for example, a two-beam interference technique), as well as providing greater repeatability than was previously possible. However, a major drawback has been that the grating wavelength and other characteristics are dictated by the period of the phase mask, and so separate masks are required for different wavelengths.

Considerable research has gone into making the phase mask approach more flexible, e.g. by incorporating a magnifying lens to alter the fibre Bragg wavelength (publication reference 3 below).

The introduction of a scanning writing beam was a further advance which enabled the fabrication of long fibre gratings without requiring a large beam magnification, as well as allowing more complex structures to be directly written by modulating the writing beam as it scans across the mask (publication references 4 and 5 below).

The ability to create more complex structures, such as apodised and/or controllably chirped gratings, is of great importance for many applications. While apodisation can be approximated by modulation of the scanning beam, this also introduces an accompanying variation in the average refractive index alone the grating length which in turn imparts an induced chirp to the grating which is often undesirable. 'Pure' apodisation (i.e. apodisation without a variation in the average refractive index) has recently been reported, but at the expense of either requiring a specially designed phase mask (publication reference 6 below), or with double exposure to two different masks (publication reference 7 below).

Considerable effort has also gone into writing controllable chirp characteristics into the grating, via a double-exposure technique (publication reference 8 below), specially designed 'step-chirp' phase masks (publication reference 9 below), or by straining the fibre (publication reference 10 below).

However, the techniques described above, which are intended to make the phase mask approach more flexible, in fact either increase dramatically the complexity of the process (by requiring multiple exposures) or still require an individual phase mask to be fabricated for each variation of the grating characteristics or pitch.

This invention provides a method of fabricating an optical waveguide mating in which a writing light beam is successively exposed through a mask onto regions of a photosensitive optical waveguide, to generate corresponding regions of the grating, the method comprising the step of: moving the mask and/or the waveguide so that the relative position of the mask with respect to the waveguide varies as different regions of the grating are generated.

Embodiments of the invention provide a simple technique which involves slowly moving the waveguide (e.g. fibre), or alternatively the phase mask (or both), as the writing beam is scanning, which is effective in overcoming or alleviating many of the limitations which are currently associated with phase masks. The approach can be used to produce multi-wavelength gratings, so-called 'pure' apodisation, as well as a variety of dispersive structures such as distributed feedback (DFB) laser structures.

In other words, the previous inflexibility of the phase mask technique is alleviated by the invention. Gratings of different characteristics, Bragg wavelength, chirp or apodisation can be produced from a single phase mask by this technique. This contrasts with previous techniques where either a respective phase mask was needed for each type of grating to be produced, or complex multiple exposure techniques, with associated alignment and uniformity problems, had to be used.

Although, for example, planar waveguides could be used, preferably the waveguide is an optical fibre. Because fibres tend to be lighter than phase masks, it is preferred that the fibre is displaced relative to a static phase mask (e.g. by a piezoelectric stage).

Although various continuous or even non-continuous writing patterns could be employed, it is preferred for ease of implementation that the writing light beam is longitudinally scanned along a portion of the waveguide. Again, for ease of implementation, it is preferred that the writing light beam is scanned along the portion of waveguide with a substantially uniform velocity.

In order to provide a simple shift of the Bragg wavelength with respect to that provided by the phase mask, it is preferred that the relative position of the mask and waveguide is varied so that the relative linear displacement of the mask and waveguide is linearly related to the distance along the waveguide of a currently exposed region of the waveguide. This can conveniently be achieved where the writing scan is at a uniform velocity, by relatively displacing the mask and waveguide at a uniform velocity.

In order to provide a linearly chirped grating, it is preferred that the relative position of the mask and waveguide is varied so that the relative linear displacement of the mask and waveguide is linearly related to the square of the distance along the waveguide of a currently exposed region of the waveguide. Again, this can conveniently be achieved where the writing scan is at a uniform velocity, by relatively displacing the mask and waveguide at a uniform acceleration.

In order to add apodisation to the grating, it is preferred that the relative position of the mask and the waveguide is varied by an oscillatory dither component. This component can be superimposed onto other motion components such as those described above. Similarly, the other various displacement components can be superimposed or applied to adjacent portions of the waveguide.

Preferably the magnitude of the dither component varies along the length of the grating. In particular, although modulated apodisation can be used to create so-called "superstructure" gratings, in one preferred embodiment the magnitude of the dither component increases with longitudinal distance from a central region of the grating. This can decrease the side-lobe reflection of the gratings.

This invention also provides apparatus for fabricating an optical waveguide grating, the apparatus comprising:
  means for successively exposing a writing light beam through a mask onto regions of a photosensitive optical waveguide, to generate corresponding regions of the grating; and
  means for moving the mask and/or the waveguide so that the relative position of the mask with respect to the waveguide varies as different regions of the grating are generated.

Preferred features of each aspect of the invention are equally applicable to other aspects of the invention.

The invention will now be described by way of example with reference to the accompanying drawings, throughout which like parts are referred to by like references, and in which.

Figure 1:
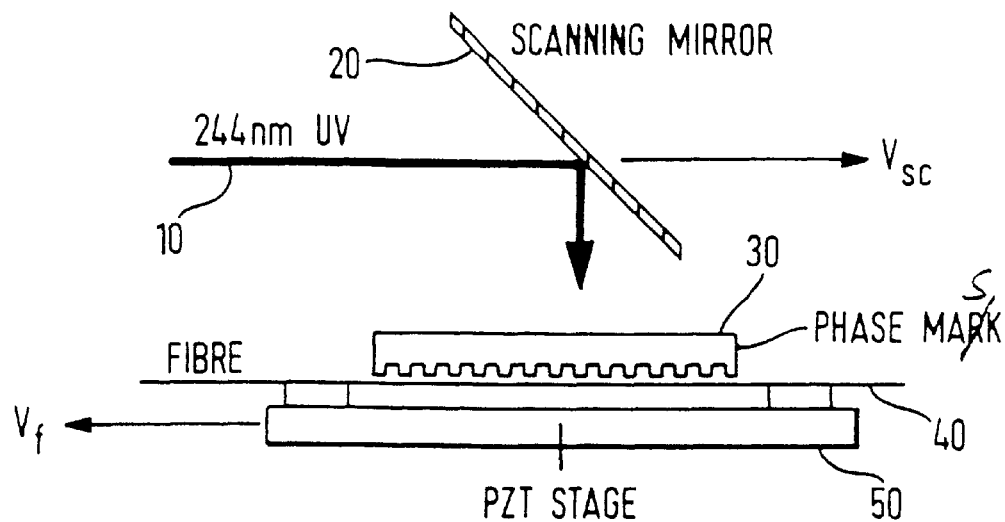
FIG. 1 is a schematic diagram of an apparatus for fabricating an optical waveguide grating.

FIG. 1 is a schematic diagram of an apparatus for fabricating an optical waveguide grating An ultraviolet (UV) writing beam 10 of 100 mW cw (milliwatt continuous wave) power at 244 nm (nanometre) wavelength is generated by a frequency-doubled argon laser (not shown). The writing beam 10 is steadily scanned by a scanning mirror 20 (driven by a stepper motor—not shown) across a zero-order, nulled phase mask 30, which in turn is positioned over a photosensitive optical fibre 40.

During the scanning process, the fibre 40 is slowly moved longitudinally relative to the mask 30, causing a phase shift dependent on the fibre displacement to be added to the fibre grating being written.

In the present embodiment, the fibre movement is provided by mounting the fibre on a piezo-electric transducer (PZT) stage 50 capable of providing a longitudinal displacement of up to about 20 $\mu$m (micrometre). An example of a suitable PZT device is available from Physik Instruments GmbH & Co. In particular, a Physik Instrument P-731-11 two-axis piezo scanning stage can be used in conjunction with a Physik Instrument P-864.11 low voltage piezo driver, a Physik Instrument E-850.00 capacitive sensor board and a Physik Instrument E-802.00 piezo control module. The scanning stage specified above has a resolution of about 1 nm and a positional accuracy of about 0.05%. The device also incorporates a capacitive feedback position sensor, so the displacement of the PZT device can be controlled by conventional external control electronics, such as those specified above.

It will be appreciated that relative motion of the fibre and mask determines the phase shift applied to the grating. Accordingly, although in FIG. 1 the fibre moves against a stationary mask, in alternative embodiments the mask could be moved with respect to a stationary fibre. Alternatively, both the fibre and the mask could be moved. In the present description, however, it will be assumed that the mask is held still and the fibre is moved as shown in FIG. 1.

A uniform velocity of the fibre 40 in FIG. 1 results in a simple shift of the Bragg wavelength. If $\lambda_0$ is the unshifted Bragg wavelength, and $v_f$ and $v_{sc}$ are the fibre and scanning beam velocities respectively, with $v_f \ll v_{sc}$ (the case of interest here), the Bragg wavelength shift $\Delta\lambda$ of the resulting grating from that obtained with the fibre position fixed with respect to the mask is given by $\Delta\lambda = \lambda_0 v_f / v_{sc}$. Thus for a shift of about 1 nm, the fibre has only to move at about 0.1% of the scanning speed.

As one example of this technique, a dual wavelength grating was fabricated using a single uniform phase mask. A dual wavelength grating is one comprising a portion having a first Bragg wavelength adjacent to a portion having a second Bragg wavelength.

Figure 2:
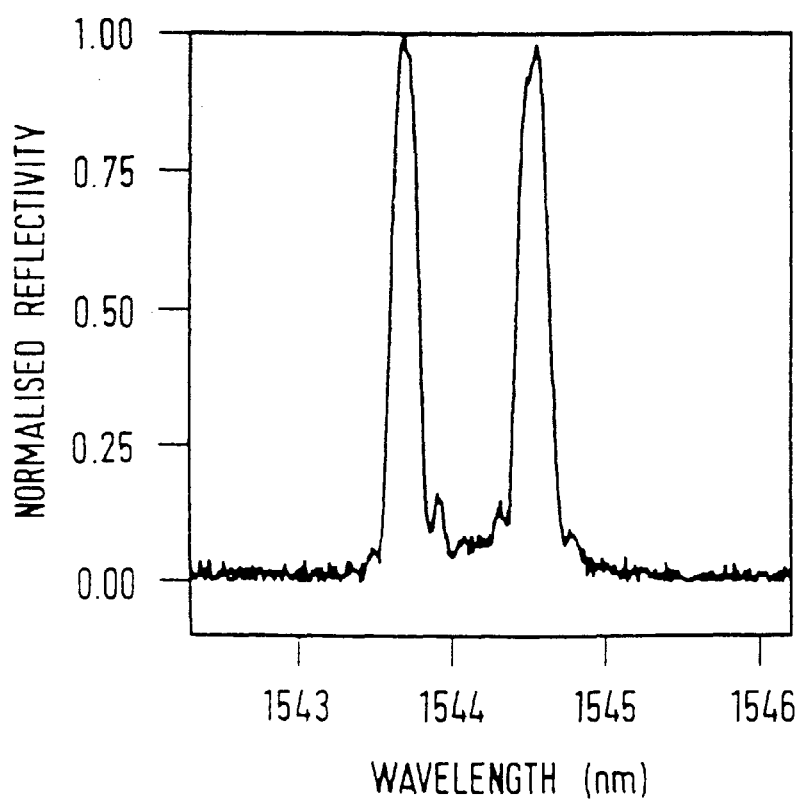
FIG. 2 is a schematic graph illustrating the reflection spectrum of a prototype dual wavelength grating fabricated using the apparatus of FIG. 1.

FIG. 2 shows the reflection spectrum of a prototype dual wavelength grating written using a boron-germania photosensitive fibre. For this prototype, the scanning beam speed was 37 $\mu$m/s, and the fibre speed was 0.01 $\mu$m/s for the first half of the writing time, switching to −0.01 $\mu$m/s for the second half of the writing time. The total length of the grating was 1 cm (centimetre). FIG. 2 illustrates the two reflectivity peaks obtained by this technique.

For large wavelength shifts, the grating strength tends to decrease as the index modulation gets averaged or 'washed out' when the fibre moves too quickly through the interference pattern formed by the phase mask. In fact, the refractive index modulation $\Delta n$ has the following dependence on $v_f$:

$$\Delta n = \sin(\pi D v_f / \Lambda v_{sc})/(\pi D v_f / \Lambda v_{sc}) = \sin(2n_{eff}\pi D \Delta\lambda/\lambda_o^2)/(2n_{eff}\pi D \Delta\lambda/\lambda_o^2)$$

where D is the writing beam diameter, $\Lambda$ is the fibre grating pitch and $n_{eff}$ is the effective refractive index ($2n_{eff}\Lambda = \lambda_o$).

Figure 3:
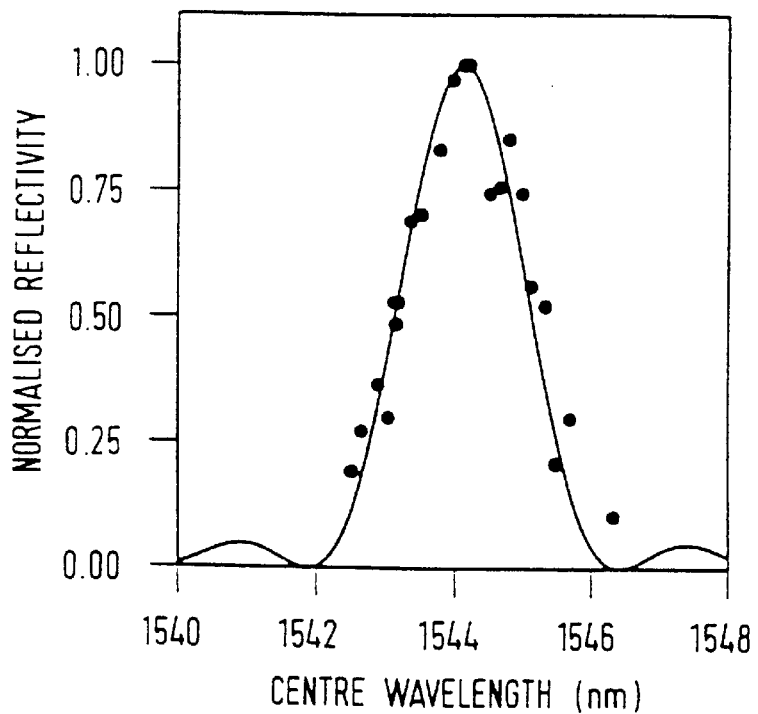
FIG. 3 is a schematic graph illustrating the dependency of reflectivity on wavelength shift for prototype gratings.

The above relation has been verified by writing weak (<20% reflectivity) gratings with different wavelength shifts, and recording their reflectivities R, which will have a $\Delta n^2$ dependence. FIG. 3 illustrates the experimental points plotted against the $\text{sinc}^2$ (i.e. sinx/x) curve expected from the above formulae, and shows that the experimental reflection data fits well to the above relationship for the (measured) beam diameter D of about 350 $\mu$m.

Also from the above equation, $\Delta n$ vanishes when $v_f = \Lambda v_{sc}/D$, or $\Delta\Lambda = \Lambda^2/D$ (where $\Delta\Lambda/\Lambda = \Delta\lambda/\lambda_o$). Accordingly, the equation shows that theoretically the maximum achievable wavelength shift is thus only dependent on the beam diameter D. Physically, this condition simply corresponds to the case where a point in the fibre moves by one grating pitch during the time $D/v_{sc}$ that the scanning beam passes over it, resulting in a spatial averaging out of the index variation. On the other hand, larger wavelength excursions of up to several nm are achievable by simply reducing the writing beam diameter.

Apodisation

Apart from shifting the Bragg resonance wavelength by uniformly moving the fibre in a single direction, so-called 'pure' apodisation can also be applied to the grating simply by longitudinally dithering the fibre back and forth as the writing beam is scanning.

In one example, the magnitude of the dither was set to decrease linearly, from one half of the grating pitch at the grating ends, down to zero dither at the centre of the grating. This produces a cosinusoidal apodisation profile.

Using this technique for apodising the grating, since the average UV fluence reaching the fibre is the same over the entire length of the grating, the average refractive index will be independent of position along the grating, and only the index modulation will vary, i.e. only $\Delta n$ is modulated. This produces what is referred to as a 'pure' apodisation effect, which contrasts with an apodised grating produced by previous techniques in which the average index varies along the length of the grating.

Figure 4:
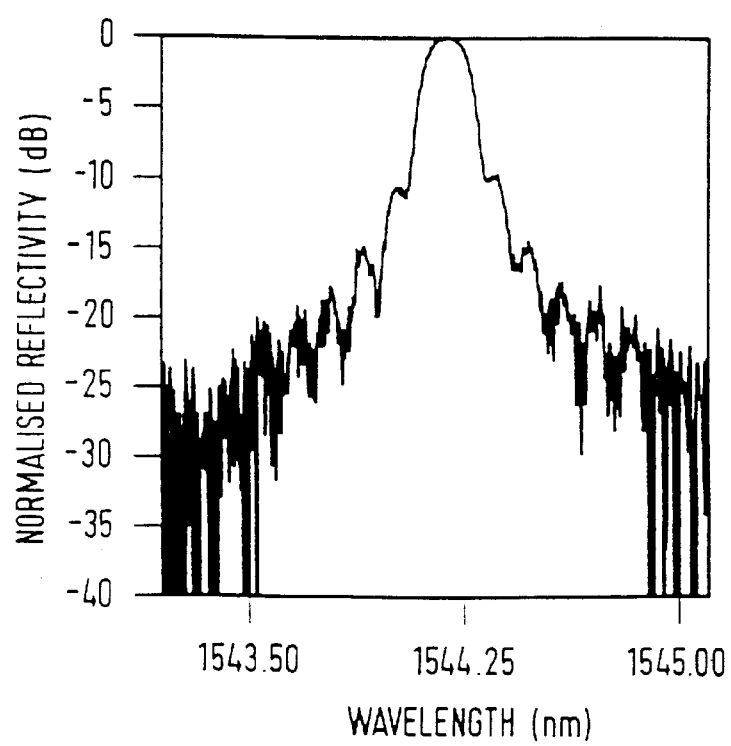
FIG. 4 is a schematic graph illustrating the reflection spectrum for a 1 centimetre long uniform fibre grating produced using previously proposed techniques.
Figure 5A:
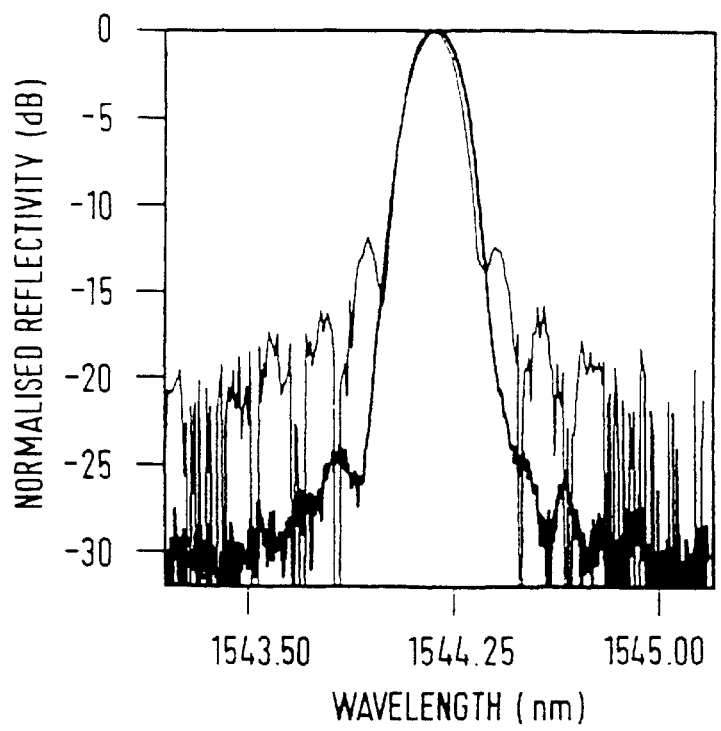
FIGS. 5a and 5b are schematic graphs illustrating reflection spectra for a 1 centimetre long apodised grating and a 1 centimetre long uniform grating.
Figure 5B:
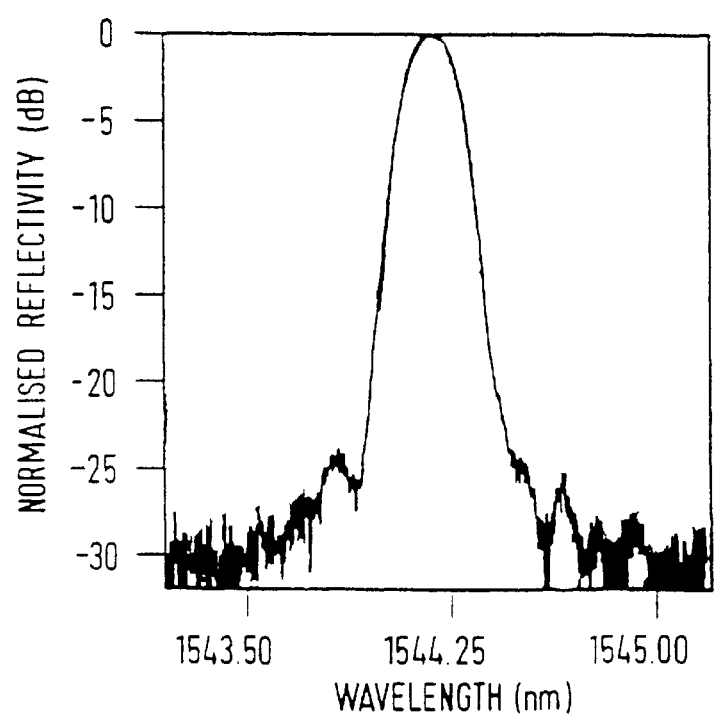

FIG. 4 shows the reflection spectrum for a uniform grating, and FIGS. 5a and 5b illustrate the corresponding spectrum obtained with the apodisation present, showing its effectiveness in reducing the side-lobe levels.

With apodisation, the reflectivity tends to be weaker (since the effective grating length is less), so for a fairer comparison, a uniform grating was written to have the same peak reflectivity and bandwidth as the apodised one. In FIG. 5a, the spectrum of the apodised grating (thick curve) is superimposed for comparison over the spectrum of the uniform grating of the same peak reflectivity and bandwidth. FIG. 5b illustrates the same apodised grating reflectivity, but without the superimposition of the uniform grating curve.

It can be seen that the side-lobes of the apodised spectrum are more than 25 dB (decibels) below the main peak, and 13 dB below those of the uniform grating. These results were achieved by simply dithering the relative position of the fibre and phase mask, but are comparable to the results by Albert et. al. (publication reference 6 below) achieved with a specialised variable diffraction efficiency phase mask.

In another application, so-called "superstructure" gratings could be produced in which the magnitude of the dither signal (and in turn, the apodisation) is modulated along the length of the grating, with a modulation period much larger than the grating period.

Chirped Gratings

Instead of applying a constant velocity to the fibre to create a wavelength shift, it is also possible to produce chirped gratings by varying the speed of the fibre relative to the mask.

Figure 6:
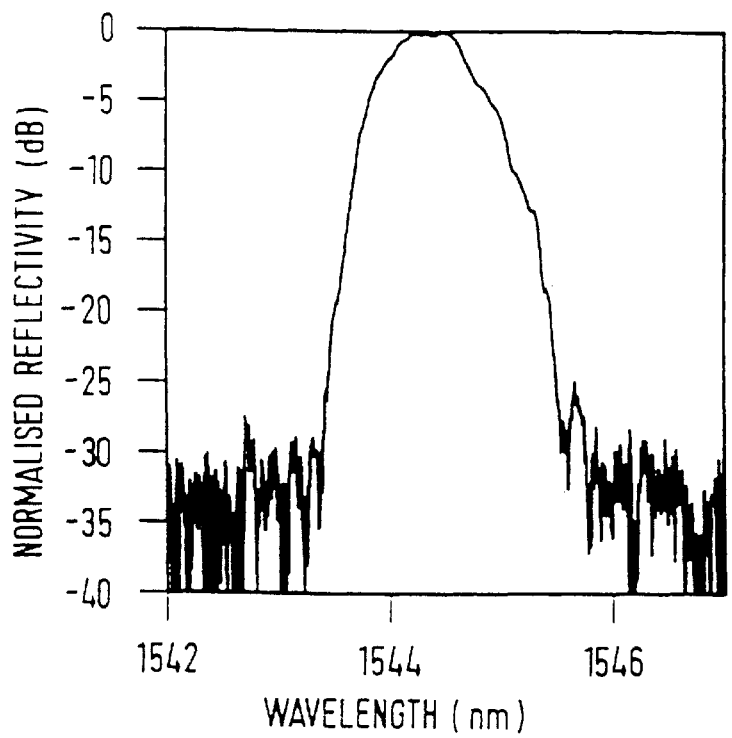
FIG. 6 is a schematic graph illustrating the reflection spectrum of an apodised chirped grating.

In one example, by simply ramping (linearly increasing or decreasing) the velocity of the fibre during the scanning time, a linearly chirped grating can be produced. FIG. 6 schematically illustrates the reflection spectrum of an example prototype 1.5 cm long apodised chirped grating made in this manner. The bandwidth of the grating of FIG. 6 is 0.82 nm and the peak reflectivity is about 40%.

Figure 7:
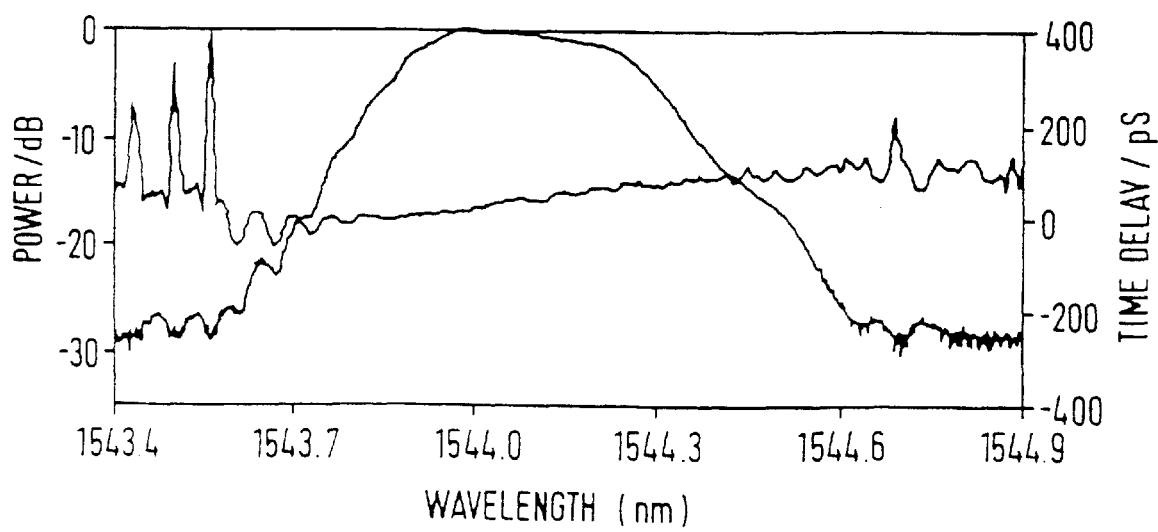
FIG. 7 is a schematic graph illustrating the dispersion characteristics of the apodised chirped grating of FIG. 6.

FIG. 7 is a schematic graph illustrating the dispersion characteristics of the apodised chirped grating of FIG. 6. This graph demonstrates that the grating has an average time delay slope over bandwidth of about 170 pS/nm picoseconds per nanometer).

However, in addition to linearly chirped gratings, other nonlinear chirp functions can be easily imposed on the grating simply by changing the velocity profile of the fibre during scanning. Indeed, in principle it is possible to compensate for an imperfect phase mask with this method and still produce good quality gratings, provided the imperfections are characterised beforehand. Also, implementing discrete phase shifts for, say, distributed feedback (DFB) type laser structures, which require a phase discontinuity, multiple phase shifts or a chirped region within the grating, can be achieved just by shifting the fibre and/or phase mask by the desired amount at the appropriate time during scanning.

In summary, the moving fibre/phase mask-scanning beam technique for producing gratings from a uniform phase mask imparts a considerable flexibility to the phase mask approach, enabling complex grating structures to be easily written simply by moving the fibre relative to the mask in the appropriate manner. Multiwavelength gratings, 'pure' apodisation and controlled chirp have all been successfully demonstrated in prototype gratings.

The techniques described above can be combined, so that a chirped apodised grating (such as that described with respect to FIGS. 6 and 7) can be produced by superimposing a dither motion onto a steadily ramping velocity component. In fact, any combination of wavelength shift, chirp and apodisation can be set up for a particular phase mask, by combining the motion components appropriate to those effects as described above.

In the above description, it has been assumed that the writing laser beam scans along the mask at a uniform velocity $v_{sc}$. From this, it follows that a simple wavelength shift requires a uniform mask/fibre displacement velocity, a chirp requires a steadily ramping mask/fibre displacement velocity and apodisation can be achieved by a symmetrical dither oscillation component (although asymmetrical dither could be used if desired). However, the skilled man will appreciate that tie techniques are equally applicable if the exposure to the writing beam is not by a uniform velocity scan. For example, the writing beam exposure might be via a scanning sweep at a non-uniform velocity, or might even be via point exposures which do not form a single continuous scanned path. In these cases, the correct relative displacement path of the mask and fibre can be derived routinely by the simple rule that the phase shift applied to the grating with respect to that provided by the mask at any time during the writing process is proportional to the displacement of the fibre with respect to the mask.

Accordingly, embodiments of the invention provide a method of forming optical waveguide gratings, such as in-fibre gratings. The gratings are formed optically, with a phase mask being scanned by a writing laser beam to generate the grating pattern. The waveguide and phase mask are moved with respect to one another during the writing process, to vary the grating properties along the length of the grating. Relative movement in a single direction provides a change of grating pitch, and so can be used to fabricate chirped or multi-wavelength gratings. Bi-directional dither alters the strength of the grating, and so can be used to fabricate apodised gratings.

The examples described above have referred primarily to optical fibres, but it will be appreciated that the techniques are also applicable to other types of waveguide such as planar waveguides.

PUBLICATION REFERENCES

1. K. O. Hill et. al., Appl. Phys. Lett., 62, 1993, pp 1035–1037.
2. D. Z. Anderson et. al., Electron. Lett., 29, 1993, pp. 566–567.
3. J. D. Prohaska et. al., Electron. Lett., 29, 1993, pp. 1614–1615.
4. J. Martin et. al., Electron. Lett., 30, 1994, pp. 811–812.
5. H. N. Rourke et. al., Electron. Lett., 30, 1994, pp. 1341–1342.
6. J. Albert et. al., Electron. Lett., 31, 1995, pp. 222–223.
7. B. Malo et. al., Electron. Lett., 31, 1995, pp. 223–224.
8. K. O. Hill et. al., Opt. Lett., 19, 1994, pp. 1314–1316.
9. R. Kashyap et. al., Electron. Lett., 30, 1994, pp. 996–997.
10. K. C. Byron et. al., Electron. Lett., 31, 1995, pp. 60–61.

We claim:

1. A method of fabricating an optical waveguide grating in which a writing light beam is successively exposed through a mask onto regions of a photosensitive optical waveguide, to generate corresponding regions of the grating, the method being characterised by the step of: moving the mask and/or the waveguide so that the relative position of the mask with respect to the waveguide varies as different regions of the grating are generated.

2. A method according to claim 1, in which the waveguide is an optical fibre.

3. A method according to claim 1 or claim 2, in which the writing light beam is longitudinally scanned along a portion of the waveguide.

4. A method according to claim 3, in which the writing light beam is scanned along the portion of waveguide with a substantially uniform velocity.

5. A method according to claim 4, in which the relative position of the mask and waveguide is varied so that the relative linear displacement of the mask and waveguide is linearly related to the distance along the waveguide of a currently exposed region of the waveguide.

6. A method according to claim 5, in which the relative position of the mask and the waveguide is varied at a substantially uniform linear velocity.

7. A method according to claim 4, in which the relative position of the mask and waveguide is varied so that the relative linear displacement of the mask and waveguide is linearly related to the square of the distance along the waveguide of a currently exposed region of the waveguide.

8. A method according to claim 7, in which the relative position of the mask and the waveguide is varied at a substantially uniform linear acceleration.

9. A method according to claim 3, in which the relative position of the mask and waveguide is varied so that the relative linear displacement of the mask and waveguide is linearly related to the distance along the waveguide of a currently exposed region of the waveguide.

10. A method according to claim 3, in which the relative position of the mask and waveguide is varied so that the relative linear displacement of the mask and waveguide is linearly related to the square of the distance along the waveguide of a currently exposed region of the waveguide.

11. A method according to claim 1, in which the relative position of the mask and the waveguide is varied by an oscillatory dither component.

12. A method according to claim 11, in which the magnitude of the dither component varies along the length of the grating.

13. A method according to claim 12, in which the magnitude of the dither component increases with longitudinal distance from a central region of the grating.

14. Apparatus for fabricating an optical waveguide grating, the apparatus comprising:

means for successively exposing a writing light beam through a mask onto regions of a photosensitive optical waveguide to generate corresponding regions of the grating;

characterised by:

means for moving the mask and/or the waveguide so that the relative position of the mask with respect to the waveguide varies as different regions of the grating are generated.

* * * * *